US011933378B2

(12) United States Patent
Nagaraja et al.

(10) Patent No.: US 11,933,378 B2
(45) Date of Patent: Mar. 19, 2024

(54) SYSTEMS AND METHODS FOR REDUCING TEMPERATURE OF A BRAKING ASSEMBLY

(71) Applicant: GOODRICH CORPORATION, Charlotte, NC (US)

(72) Inventors: Hemanth Nagaraja, Hassan (IN); Bhuwan Jain, Mississauga (CA); Basavaraj Bodki, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 247 days.

(21) Appl. No.: 17/123,971

(22) Filed: Dec. 16, 2020

(65) Prior Publication Data
US 2022/0042565 A1 Feb. 10, 2022

(30) Foreign Application Priority Data
Aug. 10, 2020 (IN) .............................. 202041034291

(51) Int. Cl.
*F16D 65/847* (2006.01)
*B64C 25/42* (2006.01)
*F16D 65/02* (2006.01)

(52) U.S. Cl.
CPC ............ *F16D 65/847* (2013.01); *B64C 25/42* (2013.01); *F16D 2065/1316* (2013.01)

(58) Field of Classification Search
CPC ........... F16D 65/847; F16D 2065/1316; B64C 25/42
See application file for complete search history.

(56) References Cited

U.S. PATENT DOCUMENTS 6,615,958 B1 * 9/2003 Baden ................... F16D 65/847
188/264 AA
9,573,570 B2 * 2/2017 Mueller ................... B60T 5/00
(Continued)

FOREIGN PATENT DOCUMENTS

CN 108995635 12/2018
WO 9747520 12/1997
(Continued)

OTHER PUBLICATIONS

European Patent Office, European Search Report dated Dec. 14, 2021 in Application No. 21190553.4.
(Continued)

*Primary Examiner* — Pamela Rodriguez
(74) *Attorney, Agent, or Firm* — SNELL & WILMER L.L.P.

(57) ABSTRACT

A system for reducing a temperature of a braking assembly includes the braking assembly of a wheel assembly, an airflow amplifier, and a conduit. The braking assembly may include a plurality of friction disks. The airflow amplifier may be coupled to the wheel assembly, and the conduit may extend from a compressed gas source to the airflow amplifier. Generally, the airflow amplifier is configured to entrain ambient air ("entrained air") in response to compressed gas from the compressed gas source flowing to the airflow amplifier via the conduit, according to various embodiments. The airflow amplifier may be configured to direct the entrained air and the compressed gas to the braking assembly to reduce the temperature of the braking assembly.

20 Claims, 6 Drawing Sheets

(56) References Cited

U.S. PATENT DOCUMENTS

| | | | | |
|---|---|---|---|---|
| 2015/0266566 A1* | 9/2015 | Ivandaev | .............. | B64C 25/405 |
| | | | | 244/50 |
| 2019/0301554 A1* | 10/2019 | Hosamane | ........... | B64D 13/006 |
| 2020/0239130 A1* | 7/2020 | She | ......................... | F16D 55/36 |

FOREIGN PATENT DOCUMENTS

| WO | 2013123993 | 8/2013 |
|---|---|---|
| WO | 2017121741 | 7/2017 |
| WO | 2018078373 | 5/2018 |
| WO | 202074805 | 4/2020 |

OTHER PUBLICATIONS

Aviation Stack Exchange, "airliner—What is the temperature of the brakes after a typical landing?", https://aviation.stackexchange.com/questions/33024/what-is-the-temperature-of-the-brakes-after-a-typical-landing/33048, pp. 1-5.

Aviation Stack Exchange, "landing gear—How are brakes cooled on heavy aircraft?", https://aviation.stackexchange.com/questions/33716/how-are-brakes-cooled-on-heavy-aircraft, pp. 1-11.

Celeroton AG, "Compressors", Ultra-high-speed electrical drive systems, https://www.celeroton.com/en/products/compressors.html, pp. 1-3.

European Patent Office, European Office Action dated May 9, 2023 in Application No. 21190553.4.

\* cited by examiner

SYSTEMS AND METHODS FOR REDUCING TEMPERATURE OF A BRAKING ASSEMBLY

CROSS-REFERENCE TO RELATED APPLICATIONS

This application claims priority to, and the benefit of, Indian Patent Application No. 202041034291, filed Aug. 10, 2020 and titled "SYSTEMS AND METHODS FOR REDUCING TEMPERATURE OF A BRAKING ASSEMBLY," which is incorporated by reference herein in its entirety for all purposes.

FIELD

The present disclosure relates to systems and methods for cooling braking assemblies, and more specifically to extending the useable life of braking assemblies.

BACKGROUND

Aircraft brake systems typically employ a series of friction disks forced into contact with each other to stop the aircraft. Friction disks splined to a non-rotating wheel axle are interspersed with friction disks splined to the rotating wheel. In response to these interleaved friction disks being pressed together during a braking actuation, significant heat is generated. Due to these high temperatures, friction disks (or at least wear surfaces thereof) are often constructed from carbon-carbon composite materials and/or steel materials. While such materials are generally able to withstand the heat, the elevated temperatures of a braking action may cause the friction disks (and other parts of the braking assembly) to undergo oxidation or to otherwise experience elevated temperature damage, which adversely affects the useable life of the friction disks.

SUMMARY

In various embodiments, the present disclosure provides a system for reducing a temperature of a braking assembly. The system may include the braking assembly of a wheel assembly, an airflow amplifier, and a conduit. The braking assembly may include a plurality of friction disks. The airflow amplifier may be coupled to the wheel assembly, and the conduit may extend from a compressed gas source to the airflow amplifier. Generally, the airflow amplifier is configured to entrain ambient air ("entrained air") in response to compressed gas from the compressed gas source flowing to the airflow amplifier via the conduit, according to various embodiments. The airflow amplifier may be configured to direct the entrained air and the compressed gas to the braking assembly to reduce the temperature of the braking assembly.

In various embodiments, the airflow amplifier is mounted to a rim of a wheel of the wheel assembly. In various embodiments, the airflow amplifier is a first airflow amplifier of a plurality of airflow amplifiers mounted to the rim of the wheel of the wheel assembly. In various embodiments, plurality of airflow amplifiers are circumferentially distributed around the rim of the wheel of the wheel assembly. The plurality of airflow amplifiers may be coupled to the same compressed gas source. The conduit may extend from a non-rotating structure of the wheel assembly to the rotating rim, and thus the conduit may include a bearing and dynamic seal at an interface between the non-rotating structure and the rim. In various embodiments, the system further includes a mounting plate to which the plurality of airflow amplifiers are directly mounted, wherein the mounting plate is mounted to the rim. The mounting plate may comprise radially extending channels that form part of the conduit.

In various embodiments, the airflow amplifier comprises an air inlet, a compressed gas inlet, and an outlet. The airflow amplifier may define a central chamber extending from the air inlet to the outlet, wherein the compressed gas inlet comprises an annular nozzle for delivering the compressed gas to the central chamber. The airflow amplifier may be coupled to the wheel assembly in such a manner so as to allow additional airflow around an exterior surface of the airflow amplifier to be entrained by exhaust flow from the outlet.

In various embodiments, the system further includes the compressed gas source, and the compressed gas source may be an air compressor. The compressed gas source may be mounted to a landing gear for the wheel assembly, such as an arm of the landing gear. The airflow amplifier may be entirely disposed within a cavity defined by a wheel bay of the wheel assembly.

Also disclosed herein, according to various embodiments, is an aircraft. The aircraft may include a landing gear having a wheel assembly, a braking assembly operatively coupled to the wheel assembly, and a plurality of airflow amplifiers coupled to a rim of a wheel of the wheel assembly. The aircraft may further include a compressed gas source coupled to the landing gear and a conduit extending from the compressed gas source to the plurality of airflow amplifiers. The plurality of airflow amplifiers are configured to entrain ambient air ("entrained air") in response to compressed gas from the compressed gas source flowing to the airflow amplifier via the conduit, wherein the plurality of airflow amplifiers are configured to direct the entrained air and the compressed gas to the braking assembly to reduce the temperature of the braking assembly, according to various embodiments.

The aircraft may further include a controller coupled in electronic control communication with at least one of the compressed gas source and a valve of the conduit to control flow of compressed gas to the plurality of airflow amplifiers. The controller may be configured to determine at least one of an actual status and an expected status of the braking assembly and to actuate the flow of the compressed gas to the plurality of airflow amplifiers in response to at least one of the actual status and the expected status of the braking assembly.

Also disclosed herein, according to various embodiments, is a method for reducing a temperature of a braking assembly of an aircraft. The method may include determining, by a processor, at least one of an actual status and an expected status of the braking assembly, wherein the actual status and expected status pertains to the temperature of the braking assembly. The method may also include, based on at least one of the actual status and the expected status of the braking assembly, actuating, by the processor, flow of compressed gas to at least one airflow amplifier mounted to a rim of a wheel of the aircraft to direct entrained air and compressed gas to the braking assembly to reduce the temperature of the braking assembly. Actuating the flow may include maintaining the flow of the compressed gas until the temperature of the braking assembly reaches a predetermined temperature.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
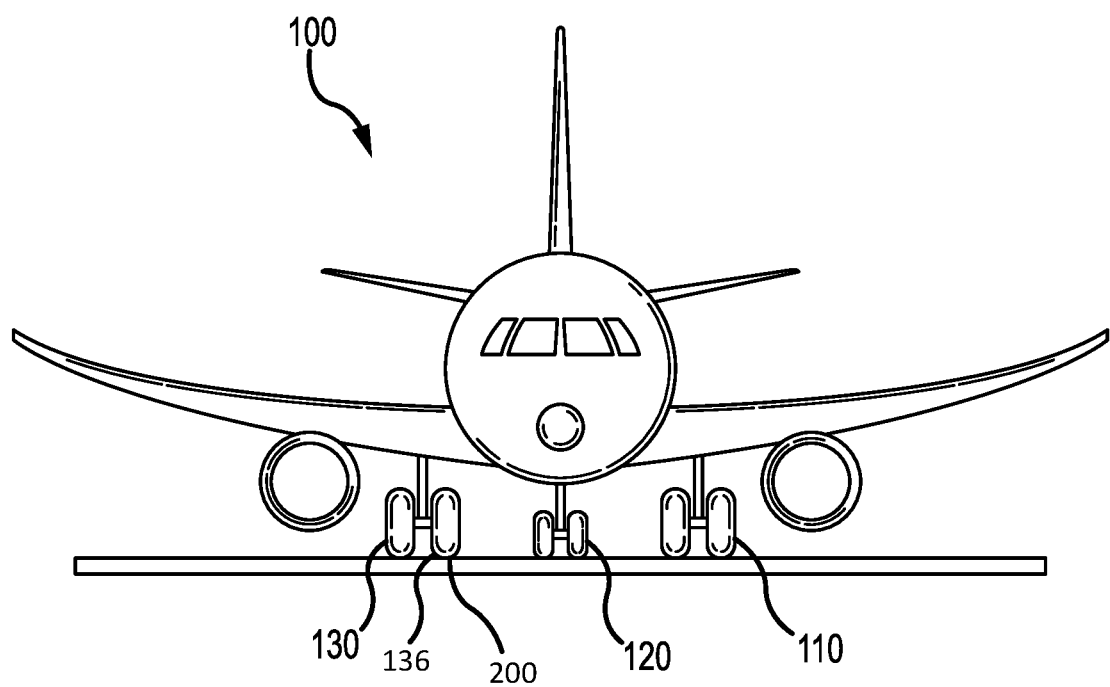
FIG. 1 illustrates an aircraft, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, are systems and methods for reducing a temperature of braking assembly (e.g., friction disks of a braking assembly). By reducing the temperature of the components of the braking assembly, oxidation and/or damage to the various components, such as the friction disks, may be inhibited, thereby improving the lifetime of such components. Generally, the systems and methods disclosed herein include utilizing airflow amplifier(s) to increase the flow of cooling gas/air to the braking assembly to lower the temperature of the friction disks of the braking assembly. While numerous details and examples are included herein pertaining to lowering the temperature of (e.g., reducing oxidation of) friction disks of aircraft braking assemblies, the scope of the present disclosure is not necessarily limited to aircraft implementations, and thus the present disclosure may be utilized to reduce oxidation of friction components in other applications.

In various embodiments, and with reference to FIG. 1, an aircraft 100 is provided. The aircraft 100 may include multiple landing gear, such as a first landing gear 110, a second landing gear 120 and a third landing gear 130. The landing gear may include one or more wheel assemblies 200 (FIG. 1). For example, the third landing gear 130 may include an inner/inboard wheel assembly and an outer/outboard wheel assembly. The aircraft may also include one or more braking assemblies at each wheel assembly. The braking assembly, as described in greater detail below with reference to FIG. 2, may generally include a plurality of interleaved friction disks that may be actuated to exert a braking force to decelerate and/or stop the aircraft 100. Each wheel assembly of the aircraft 100 may be designed to receive a tire. For example, a tire 136 may be placed about an outer circumference of wheel assembly 200.

Figure 2:
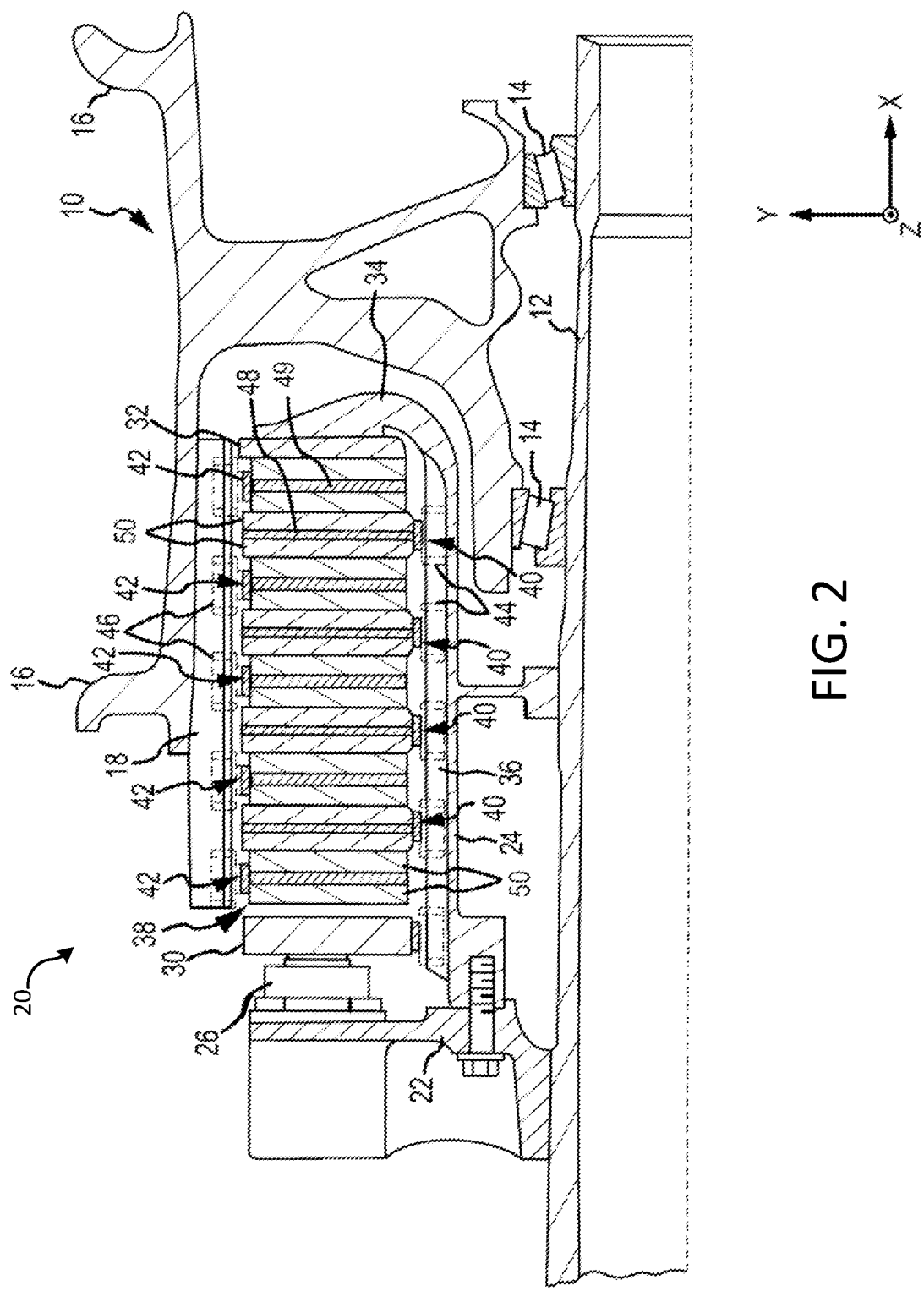
FIG. 2 illustrates a cross-sectional view of a multi-disk brake system, in accordance with various embodiments.

Referring to FIG. 2, a multi-disk braking assembly 20 is illustrated according to various embodiments. The braking assembly may be operatively mounted to the wheel assembly/landing gear of the aircraft 100. The braking assembly 20 may include a wheel 10 supported for rotation around axle 12 by bearings 14. Axle 12 defines an axis of multi-disk braking assembly 20 and the various components thereof described herein, and any reference to the terms axis and axial may include an axis of rotation defined by axle 12 or a dimension parallel to such axis. Wheel 10 includes rims 16 for supporting a tire, and a series of axially extending rotor splines 18 (one shown). Rotation of wheel 10 is modulated by multi-disk braking assembly 20. Multi-disk braking assembly 20 includes torque flange 22, torque tube 24, a plurality of pistons 26 (one shown), pressure plate 30, and end plate 32. Torque tube 24 may be an elongated annular structure that includes reaction plate 34 and a series of axially extending stator splines 36 (one shown). Reaction plate 34 and stator splines 36 may be integral with torque tube 24, as shown in FIG. 2, or attached as separate components.

Multi-disk braking assembly 20 also includes a plurality of friction disks 38. Each friction disk 38 may comprise a friction disk core. The plurality of friction disks 38 includes at least one friction disk with a non-rotatable core, also known as a stator 40, and at least one friction disk with a rotatable core, also known as a rotor 42. Stators 40 and rotors 42 may be located adjacent to one another in multi-disk braking assembly 20, forming a plurality of adjacent stator-rotor pairs. Stators 40 may comprise a stator core 48 and wear liners 50. Rotors 42 may comprise a rotor core 49 and wear liners 50. Each friction disk 38 includes an attachment structure. In various embodiments, each of the stators 40 includes a plurality of stator lugs 44 at circumferentially spaced positions around stator 40 as an attachment structure. Similarly, each of the five rotors 42 includes a plurality of rotor lugs 46 at circumferentially spaced positions around rotor 42 as an attachment structure. In various embodiments, pressure plate 30, end plate 32, and friction disks 38 are all annular structures made at least partially from a carbon composite material.

Torque flange 22 may be mounted to axle 12. Torque tube 24 is bolted to torque flange 22 such that reaction plate 34 is near an axial center of wheel 10. End plate 32 is connected to a surface of reaction plate 34 facing axially inward. Thus, end plate 32 is non-rotatable by virtue of its connection to torque tube 24. Stator splines 36 support pressure plate 30 so that pressure plate 30 is also non-rotatable. Stator splines 36 also support stators 40 via stator cores 48. Stator cores 48 engage stator splines 36 with gaps formed between stator lugs 44. Similarly, rotors 42 engage rotor splines 18 via rotor core 49 with gaps formed between rotor lugs 46. Thus, rotor cores 49 of rotors 42 are rotatable by virtue of their engagement with rotor splines 18 of wheel 10.

As shown in FIG. 2, rotors 42 with rotor cores 49 are arranged with end plate 32 on one end, pressure plate 30 on the other end, and stators 40 with stator cores 48 interleaved so that rotors 42 with rotor cores 49 are directly or indirectly adjacent to non-rotatable friction components. Pistons 26 are connected to torque flange 22 at circumferentially spaced positions around torque flange 22. Pistons 26 face axially toward wheel 10 and contact a side of pressure plate 30 opposite friction disks 38. Pistons 26 may be powered electrically, hydraulically, or pneumatically. In various embodiments, the torque tube 24 and/or torque flange 22 is secured to a static (non-rotating) structure, such as a bogie beam or a landing gear strut.

In various embodiments, in response to actuation of pistons 26, a force, towards reaction plate 34, is exerted on the rotatable friction disks 42 and the non-rotatable friction disks 40. The rotatable friction disks 42 and the non-rotatable friction disks 40 may thus be pressed together between pressure plate 30 and end plate 32. This compression of the friction disks during a braking action often generates substantial heat. While frictions disks, or at least wear liners of friction disks, may be made from a material that is capable of withstanding the heat, such as carbon-carbon composite materials or steel materials, the elevated temperature of the friction disks may render the disks susceptible to oxidation or other forms of temperature damage, which would reduce the useable life of the friction disks. Accordingly, the system and methods described below are configured to reduce the temperature of the braking assembly during, after, before, and/or between brake usage.

Figure 3:
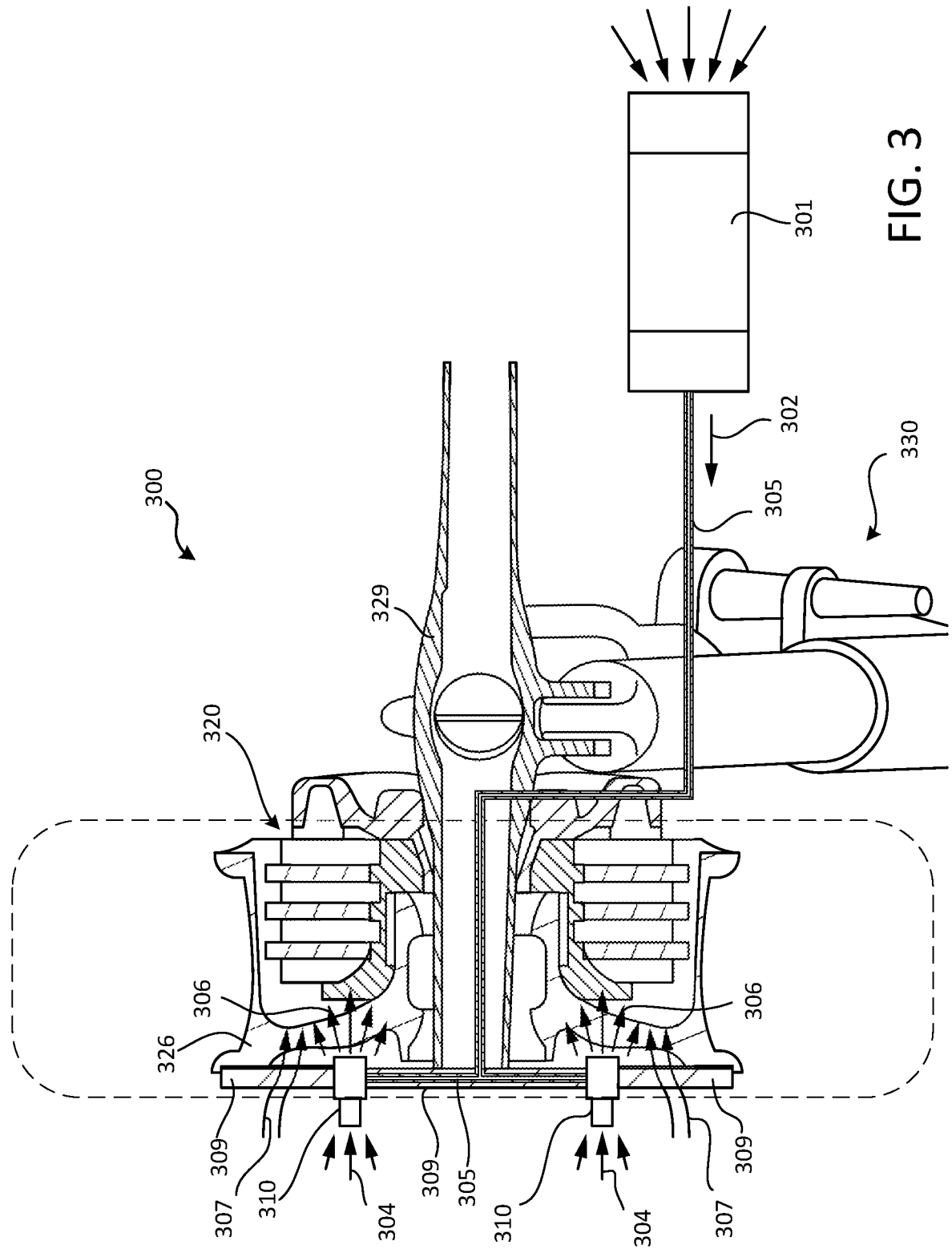
FIG. 3 illustrates a cross-sectional view of a system for reducing a temperature of a braking assembly, in accordance with various embodiments.

In various embodiments, and with reference to FIG. 3, a system 300 for reducing a temperature of a braking assembly 320 is provided. The system 300 may include a braking assembly 320 (e.g., braking assembly 20 of FIG. 2) and a conduit 305 configured to direct compressed gas 302 (note the arrow representing the flow of compressed gas is shown outside the conduit 305, though the flow is actually within the conduit 305) from a compressed gas source 301 to an airflow amplifier 310 (or a plurality of airflow amplifiers). The airflow amplifier(s) 310 is coupled to the wheel assembly, such as the rim 326 of one of the wheels, according to various embodiments. The airflow amplifier(s) 310 is generally configured to entrain ambient air (referred to herein as "entrained air 304") in response to the compressed gas 302 flowing to/through the airflow amplifier 310, according to various embodiments. In accordance with various embodiments, the airflow amplifier 310 is configured to direct a combined stream 306 of the entrained air 304 and the compressed gas 302 to the braking assembly 320, thereby augmenting convective cooling in the braking assembly 320 (e.g., around the friction disks) to reduce the temperature of the braking assembly 320. The reduced temperature may mitigate oxidation of the braking assembly 320. Additional details pertaining to the structure of the airflow amplifier(s) 310 are included below with reference to FIGS. 4 and 5.

The compressed gas source 301, the conduit 305, and the airflow amplifiers 310 are shown schematically in FIG. 3, and thus the routing, position, size, and/or orientation of the compressed gas source 301, the conduit 305, and the airflow amplifiers 310, relative to each other and/or relative to other components of the system 300, is not to be limited to the depiction in FIG. 3. In various embodiments, the airflow amplifier 310 is mounted to a rim 326 of a wheel of the wheel assembly. The airflow amplifier 310 may be at least partially positioned within a hole/aperture of the rim 326, thus allowing the combined stream 306 to pass through the rim 326 to the braking assembly 320. For example, the airflow amplifier 310 may be configured to specifically direct the combined stream at one or more friction disks.

In various embodiments, the system 300 includes a plurality of airflow amplifiers 310 mounted to the rim 326. The plurality of airflow amplifiers 310 may be circumferentially distributed around the rim 326 to more uniformly distribute the cooling convective airflow around the braking assembly 320. In various embodiments, each airflow amplifier of the plurality of airflow amplifiers 310 may be specifically directed at a certain region/portion of the braking assembly. For example, a first airflow amplifier may be directed at an outboard-most friction disk (or set of outboard-most friction disks) while a second airflow amplifier may be directed at an adjacent friction disk (or set of friction disks) and so on, thus allowing for the entire stack of friction disks to be convectively cooled. In various embodiments, multiple airflow amplifiers 310 are fluidly coupled (via the conduit 305) to the same compressed gas source 301. Said differently, a single compressed gas source can be used to supply compressed gas to multiple airflow amplifiers. For example, there may be between 2 and 12 airflow amplifiers in various embodiments, or more, that are supplied with compressed gas from the same compressed gas source. In various embodiments, the system 300 may include multiple conduits respectively from multiple compressed gas sources, with each conduit feeding a set of airflow amplifiers.

In various embodiments, the conduit 305 extends from a non-rotating structure (e.g., an axle 329, a bogue axle, a landing gear 330, etc.) of the aircraft to a rotating structure of the aircraft (e.g., the rim 326). Thus, the conduit 305 may include a bearing and dynamic seal at an interface between the non-rotating structure and the rotating structure. For example, the conduit interface between the non-rotating structure and the rotating structure may include a rotary union joint that facilitate fluid transfer to rotating components. In various embodiments, the compressed gas source 301, which may be an air compressor or some other source of pressurized gas, may be mounted to landing gear or some other non-rotating structure. In various embodiments, the compressed gas source may be a tank of compressed gas, or a solid state material that generates gas via chemical reaction or some other mechanism.

In various embodiments, the compressed gas source 301 may be an inert fluid source. That is, while the compressed gas may be air, in other embodiments the compressed gas may be nitrogen gas or other conventional inert fluids, such as helium, neon, argon. For example, the compressed gas may be a nitrogen-enriched air stream comprising less than 20 volume % of oxygen. In various embodiments, the compressed gas has a volume percent of oxygen of less than 15%. In various embodiments, the oxygen content in the compressed is less than 10 volume percent.

In various embodiments, the system 300 may include a mounting plate 309 to which the airflow amplifiers 310 are directly mounted. The mounting plate 309 may be a circular plate or the mounting plate may be an annular plate having radially extending sections. The mounting plate may define portions of the conduit 305, such as radially extending channels, that facilitate delivery of the compressed gas to each of the airflow amplifiers 310. The mounting plate 309 may be generally configured to allow for the airflow amplifiers 310 to be easily affixed to the rim/wheel via the mounting plate 309. That is, instead of individually mounting each airflow amplifier 310 to the wheel/rim, the airflow amplifiers 310 may be directly affixed to the mounting plate 309, and the mounting plate 309 may be affixed to the wheel/rim. In various embodiments, the airflow amplifier 310 are entirely disposed within a cavity defined by a wheel bay of the wheel assembly. Said differently, the size and mounting configuration of airflow amplifiers 310 may be selected such that the outboard end of each airflow amplifier does not extend beyond the protective volume of the wheel bay.

In various embodiments, instead of the mounting plate being coupled to the rotating wheel/rim, the mounting plate may be directly mounted to the axle. For example, the mounting plate may be retained/secured outboard of the wheel (e.g., by an axle nut or the like). In such a configuration, the non-rotating mounting plate may be positioned so as to have sufficient clearance from the rotating wheel.

Figure 4:
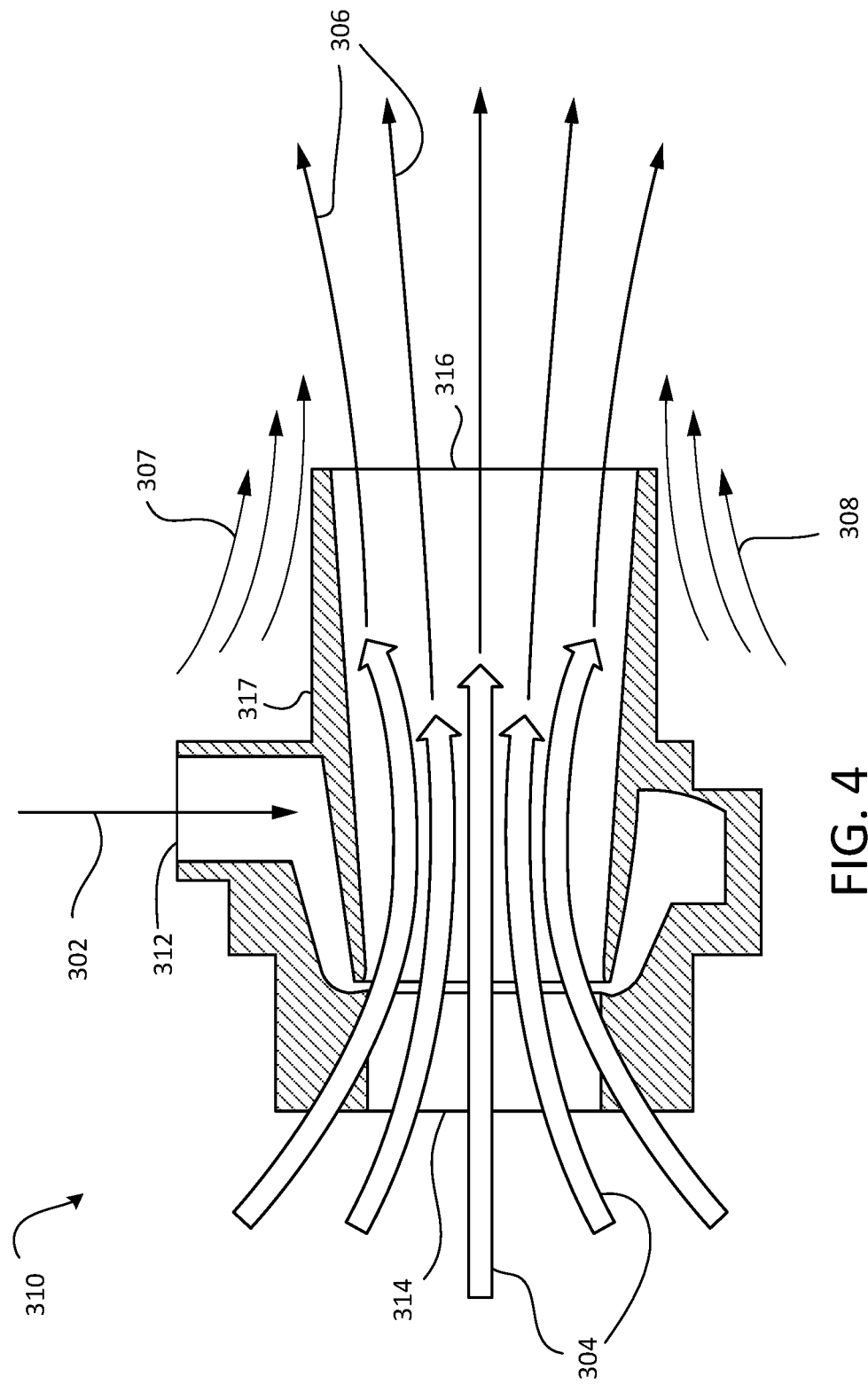
FIG. 4 illustrates a cross-sectional view of an airflow amplifier, in accordance with various embodiments.

In various embodiments, and with reference to FIG. 4, each airflow amplifier 310 may be a throttled ring-type amplifier that utilizes the "Coanda effect" to induce ambient airflow. That is, each airflow amplifier 310 may comprise an inlet side (e.g., an air inlet 314), a compressed gas inlet 312, and an outlet side (e.g., an outlet 316 or an exhaust end). The airflow amplifier 310 may define a central chamber extending from the air inlet 314 to the outlet 316, and the compressed gas inlet 312 may be a port in fluid receiving communication with the conduit 305 that delivers the compressed gas 302 to an annular chamber defined in the airflow amplifier 310. The airflow amplifier may include an annular nozzle (e.g., a ring nozzle) for delivering the compressed gas from the annular chamber into the central chamber. Due to the "Coanda effect," the compressed gas stays attached to the inner surface of the central chamber as the compressed gas flows toward the outlet 316. The movement of the compressed gas along the interior walls of the central chamber creates a vacuum that induces/entrains ambient air (i.e., the entrained air 304) into the central chamber through the air inlet 314, thus utilizing the pressurized compressed gas to entrain a large flow volume of air to facilitate with the convective cooling of the braking assembly. That is, because of the air entrainment, the total flow rate (i.e., the total mass/molar flow rate of fluid) that is delivered to the braking assembly for cooling purposes is greater than would be possible if only the compressed gas source was utilized. In various embodiments, and as described in more detail with reference to FIG. 5, the airflow amplifier 310 may also entrain additional airflow 307 around the exterior surface 317 of the airflow amplifier by the flow velocity of the combined stream 306 (e.g., the exhaust flow) emitted from the outlet 316.

In various embodiments, the airflow amplifier 310 is a non-electric component. In various embodiments, the airflow amplifier is passive and has no internal moving parts. Accordingly, the weight and overall sound level of these airflow amplifier(s) may be less than pumps, fans, or other air movers that use impellors or other mechanical means. For example, the sound level of the airflow amplifier during operation may be less than 90 dBa, or even less than 80 dBa. The airflow amplifier may be made from a metallic material, such as stainless steel and/or aluminum.

As mentioned above, the size, capacity, and number of airflow amplifiers may be selected according to the cooling needs of a specific braking assembly/wheel assembly. In various embodiments, each airflow amplifier may provide an amplification ratio (defined as inlet flow rate compared to the combined outlet flow rate) of between 1:15 and 1:35. That is, the volumetric flow rate of the combined stream 306 (including any additional airflow 307) may be between 15 and 35 times the volumetric flow rate of the compressed gas 302 flowing into the airflow amplifier. This amplification ratio depends on various factors, such as whether the airflow amplifier is mounted in a ducted or un-ducted configuration (see below with reference to FIG. 5). In various embodiments, the cumulative volumetric flow rate of the combined streams from the plurality of airflow amplifiers is between 200 liters per second (~420 SCFM) to 600 liters per second (~1270 SCFM). These cumulative flow rate numbers may be achieved, for example, by a single air compressor coupled to four (4) airflow amplifiers, according to various embodiments.

Figure 5:
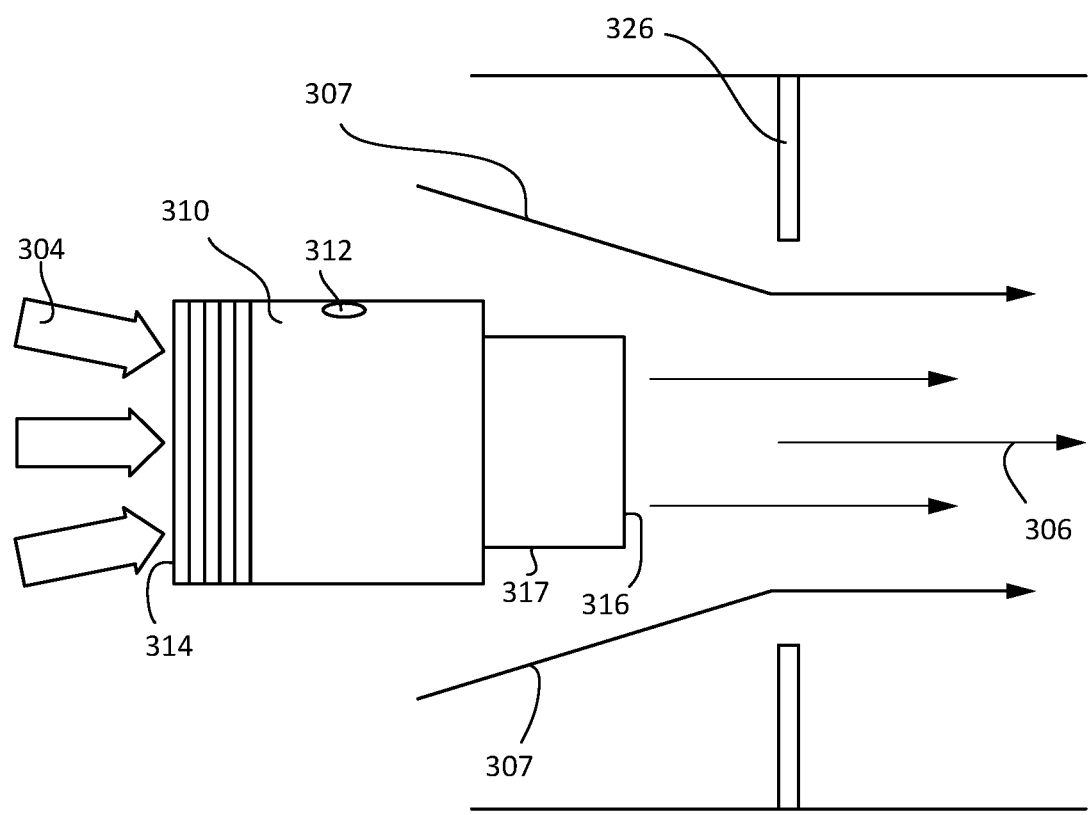
FIG. 5 illustrates a cross-sectional view of an airflow amplifier relative to a hole in a rim of a wheel assembly, in accordance with various embodiments.

In various embodiments, and with reference to FIG. 5, the airflow amplifier 310 may be coupled to wheel assembly in such a manner so as to allow additional airflow 307 around the exterior surface 317 of the airflow amplifier 310 to be entrained by the combined stream 306 (e.g., exhaust flow) from the outlet 316. Such a configuration is referred to as a un-ducted configuration, and this configuration results in higher amplification ratios. In various embodiments, the airflow amplifiers 310 are each mounted to leave gaps between the rim 326 and the exterior surface 317 of the airflow amplifier to allow for this additional airflow entrainment.

Figure 6:
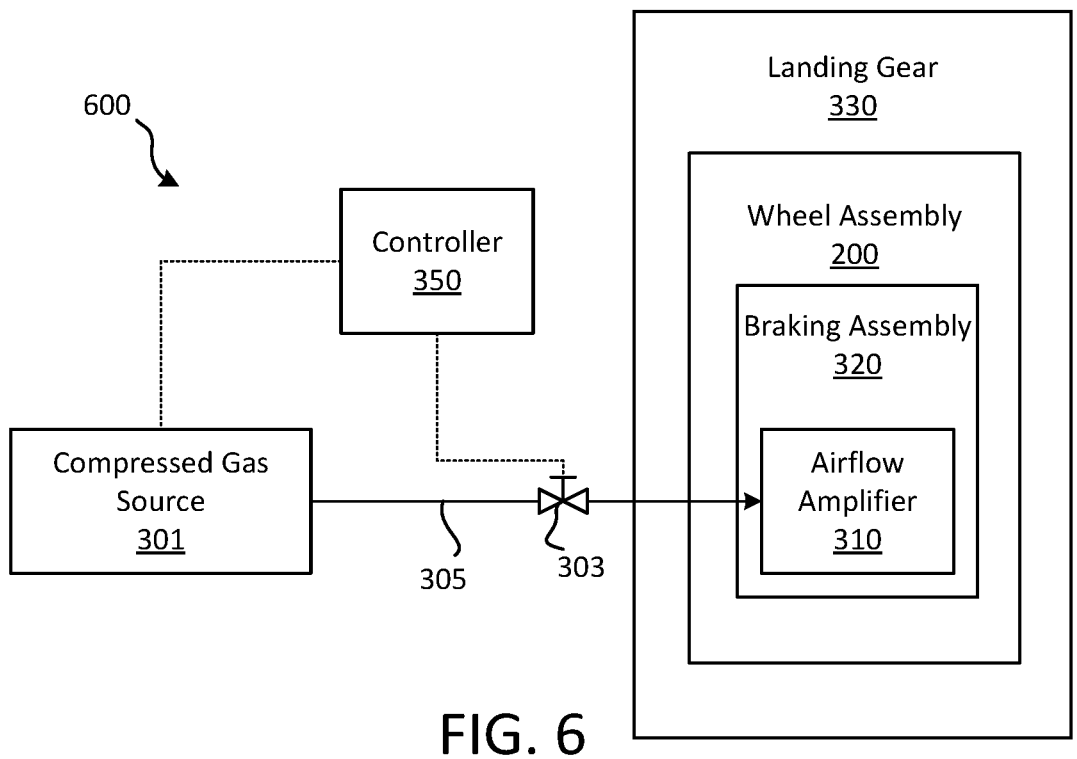
FIG. 6 is a schematic block diagram of a system for reducing a temperature of a braking assembly, in accordance with various embodiments.

In various embodiments, and with reference to FIG. 6, a schematic block diagram of an aircraft 600 is provided. The aircraft 600, which may be aircraft 100, includes a compressed gas source 301, a controller 350, a landing gear 330, a wheel assembly 200, a braking assembly 320, and a plurality of airflow amplifiers 310. The landing gear 330 may include the wheel assembly 200, and the braking assembly 320 may be operatively coupled to the wheel assembly 200 and may include a plurality of friction disks, as described above. The plurality of airflow amplifiers 310 may be coupled to a rim of a wheel of the wheel assembly 200. The compressed gas source 301 may be coupled/mounted to the landing gear 330, and a conduit 305 may extend from the compressed gas source 301 to the plurality of airflow amplifiers 310. As described above, the plurality of airflow amplifiers 310 may be generally configured to entrain ambient air ("entrained air") in response to compressed gas from the compressed gas source flowing to the airflow amplifier via the conduit, wherein the plurality of airflow amplifiers are configured to direct the entrained air and the compressed gas to the braking assembly to reduce the temperature of the braking assembly.

In various embodiments, the controller 350 is in electronic control communication with at least one of the compressed gas source 301 and/or one or more valves 303 disposed along the conduit to control flow of the compressed gas to the plurality of airflow amplifiers. Generally, the controller 350 is configured to selectively control delivery of the compressed gas to the braking assembly. For example, delivery of the compressed gas to the plurality of airflow amplifiers via the conduit 305 may be actuated in response to determining a status of the braking assembly 320 (e.g., based on input and/or feedback from various sensors or other devices of the aircraft). The status of the braking assembly 320 may pertain to a temperature of the braking assembly, specifically the friction disks. Accordingly, the controller 350 may be configured to determine at least one of an actual status and an expected status of the braking assembly and to actuate the flow of the compressed gas to the plurality of airflow amplifiers in response to at least one of the actual status and the expected status of the braking assembly. For example, the status may be a threshold aircraft speed, a threshold aircraft deceleration, a threshold temperature of the braking assembly, a threshold braking force, and/or an aircraft landing event, according to various embodiments.

The controller 350 may be integrated into computer systems onboard aircraft such as, for example, a brake control unit (BCU), a full authority digital engine control (FADEC), an engine-indicating and crew-alerting system (EICAS), and/or the like. The controller 350 may also be a standalone computer system separate from aircraft and in electronic communication with aircraft, as described in further detail herein. The controller 350 may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, the processor of the controller 350 may be configured to implement various logical operations in response to execution of instructions, for example, instructions stored on the non-transitory memory (e.g., tangible, computer-readable medium). As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re *Nuijten* to fall outside the scope of patentable subject matter under 35 U.S.C. § 101.

Figure 7:
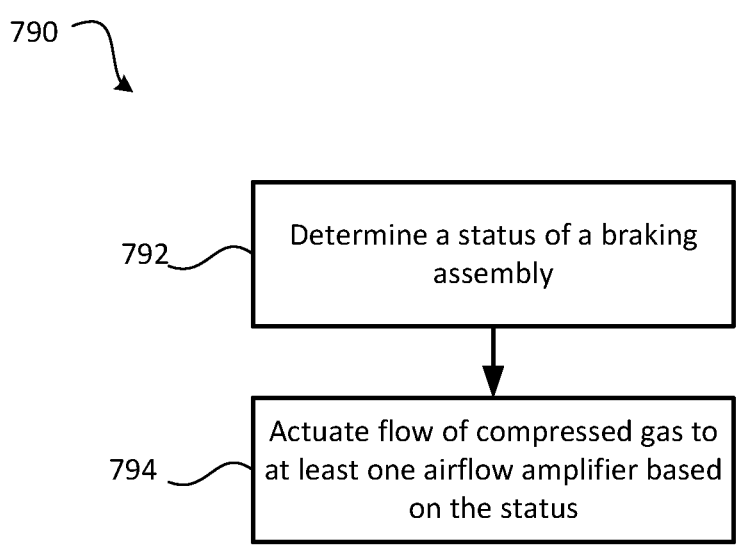
FIG. 7 is a schematic flow chart diagram of a method for reducing a temperature of a braking assembly, in accordance with various embodiments.

In various embodiments, and with reference to FIG. 7, a method 790 for reducing a temperature of a braking assembly is provided. The method 790 may include determining a status of a braking assembly at step 792 and actuating flow of compressed gas to at least one airflow amplifier based on the determined status at step 794. The status of the braking assembly may generally pertain to a temperature of the friction disks (e.g., a likelihood of oxidation of the friction disks of the braking assembly). Said differently, the determined status of the braking assembly may be a detected, sensed, or calculated condition of the aircraft that is indicative of whether oxidation would occur if not for delivery of the cooling convective flow using the airflow amplifiers.

In various embodiments, determining the status of the braking assembly is performed by a controller of an aircraft control system of the aircraft. In various embodiments, determining the status of the braking assembly comprises determining if an aircraft speed meets a threshold aircraft speed. In various embodiments, determining the status of the braking assembly comprises determining if an aircraft deceleration meets a threshold aircraft deceleration. In various embodiments, determining the status of the braking assembly comprises determining if a temperature of the braking assembly meets a threshold temperature of the braking assembly. In various embodiments, wherein determining the status of the braking assembly comprises determining if a braking force meets a threshold braking force. In various embodiments, determining the status of the braking assembly comprises determining a landing event of the aircraft.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for reducing a temperature of a braking assembly, the system comprising:
    the braking assembly of a wheel assembly, the braking assembly comprising a plurality of friction disks;
    an airflow amplifier coupled to the wheel assembly, wherein the airflow amplifier is configured to provide an amplification ratio of about 1:15 to about 1:35;
    a compressed gas source comprising a solid state material that generates gas via a chemical reaction; and
    a conduit extending from the compressed gas source to the airflow amplifier;
    wherein the airflow amplifier is configured to entrain ambient air in response to the compressed gas from the compressed gas source flowing through the airflow amplifier via the conduit, wherein the airflow amplifier is configured to direct the entrained air and the compressed gas onto the braking assembly to reduce the temperature of the braking assembly.

2. The system of claim 1, wherein the airflow amplifier is mounted to a rim of a wheel of the wheel assembly.

3. The system of claim 2, wherein the airflow amplifier is a first airflow amplifier of a plurality of airflow amplifiers mounted to the rim of the wheel of the wheel assembly.

4. The system of claim 3, wherein the plurality of airflow amplifiers are circumferentially distributed around the rim of the wheel of the wheel assembly.

5. The system of claim 3, wherein the plurality of airflow amplifiers are coupled to the compressed gas source.

6. The system of claim 5, wherein the conduit extends from a non-rotating structure of the wheel assembly to the rim, wherein the conduit comprises a bearing and dynamic seal at an interface between the non-rotating structure and the rim.

7. The system of claim 3, further comprising a mounting plate to which the plurality of airflow amplifiers are directly mounted, wherein the mounting plate is mounted to the rim.

8. The system of claim 7, wherein the mounting plate comprises radially extending channels that form part of the conduit.

9. The system of claim 1, wherein the airflow amplifier comprises an air inlet, a compressed gas inlet, and an outlet.

10. The system of claim 9, wherein the airflow amplifier defines a central chamber extending from the air inlet to the outlet, wherein the compressed gas inlet comprises an annular nozzle for delivering the compressed gas to the central chamber.

11. The system of claim 10, wherein the airflow amplifier is coupled to the wheel assembly in such a manner so as to allow additional airflow around an exterior surface of the airflow amplifier to be entrained by exhaust flow from the outlet.

12. The system of claim 1, further comprising the compressed gas source, wherein the compressed gas source is mounted to a landing gear for the wheel assembly.

13. The system of claim 12, wherein the compressed gas source is mounted to an arm of the landing gear.

14. The system of claim 1, wherein the airflow amplifier is entirely disposed within a cavity defined by a wheel bay of the wheel assembly.

15. The system of claim 1, wherein the compressed gas includes Nitrogen, Helium, Neon, Argon, or another inert gas.

16. An aircraft comprising:
    a landing gear comprising a wheel assembly;
    a braking assembly operatively coupled to the wheel assembly of the landing gear, the braking assembly comprising a plurality of friction disks;
    a plurality of airflow amplifiers coupled to a rim of a wheel of the wheel assembly, each of the plurality of airflow amplifiers being configured to provide an amplification ratio of about 1:15 to about 1:35;
    a compressed gas source coupled to the landing gear, wherein the compressed gas source comprises a solid state material that generates gas via a chemical reaction; and
    a conduit extending from the compressed gas source to the plurality of airflow amplifiers;
    wherein the plurality of airflow amplifiers are configured to entrain ambient air in response to the compressed gas from the compressed gas source flowing through the plurality of airflow amplifiers via the conduit, wherein the plurality of airflow amplifiers are configured to direct the entrained air and the compressed gas onto the braking assembly to reduce a temperature of the braking assembly.

17. The aircraft of claim 16, further comprising a controller coupled in electronic control communication with at least one of the compressed gas source and a valve of the conduit to control flow of the compressed gas to the plurality of airflow amplifiers.

18. The aircraft of claim 17, wherein the controller is configured to determine at least one of an actual status and an expected status of the braking assembly and to actuate the flow of the compressed gas to the plurality of airflow amplifiers in response to at least one of the actual status and the expected status of the braking assembly.

19. A method for reducing a temperature of a braking assembly of an aircraft, the method comprising:
    determining, by a processor, at least one of an actual status and an expected status of the braking assembly, wherein the actual status and the expected status pertains to the temperature of the braking assembly; and
    based on at least one of the actual status and the expected status of the braking assembly, actuating, by the processor, flow of a compressed gas generated by a solid state material via a chemical reaction to at least one airflow amplifier mounted to a rim of a wheel of the aircraft to direct entrained air and the compressed gas onto the braking assembly to reduce the temperature of the braking assembly, wherein the at least one airflow amplifier is configured to provide an amplification ratio of about 1:15 to about 1:35.

20. The method of claim 19, wherein actuating, by the processor, the flow of the compressed gas comprises maintaining the flow of the compressed gas until the temperature of the braking assembly reaches a predetermined temperature.

* * * * *